Patented Aug. 9, 1949

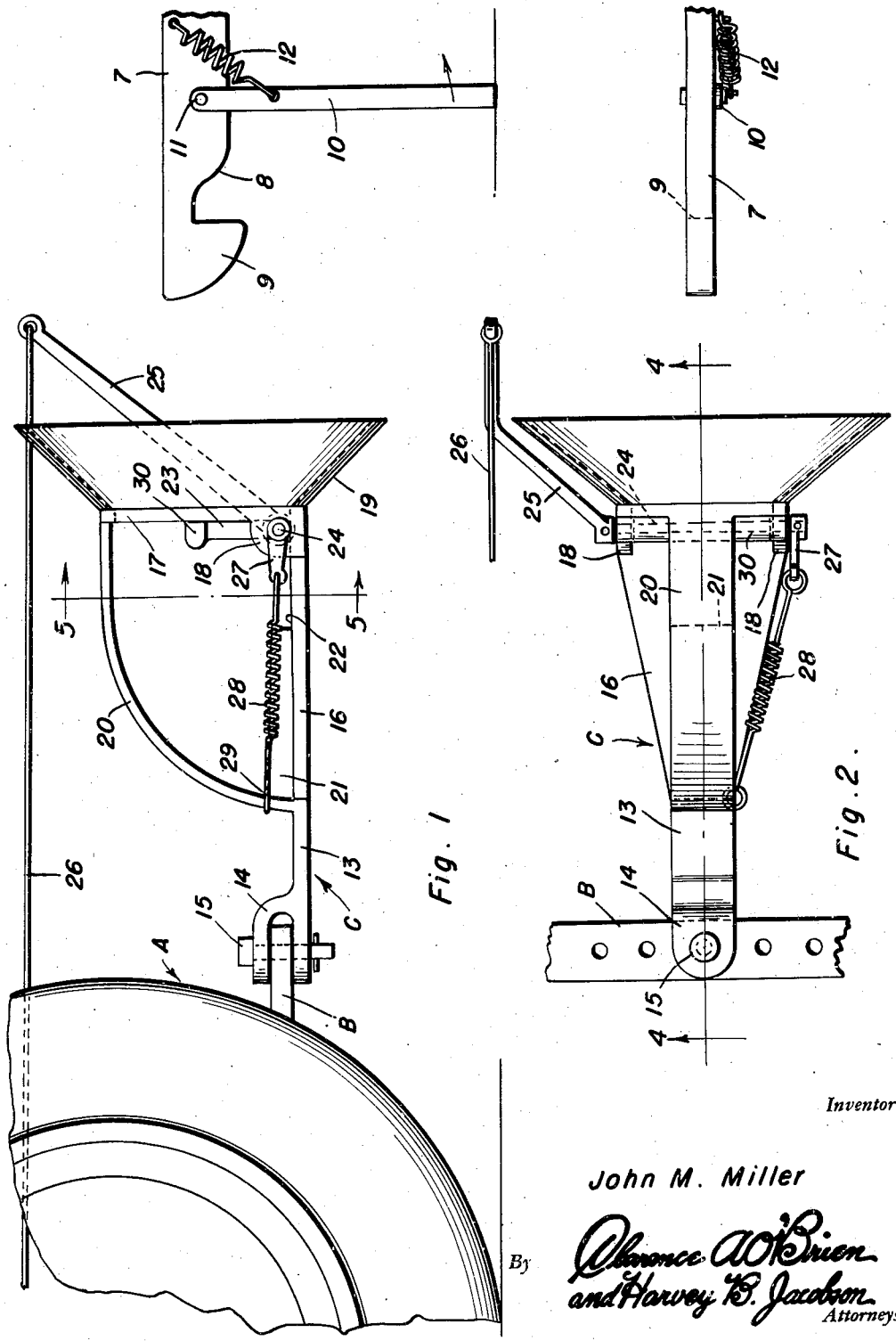

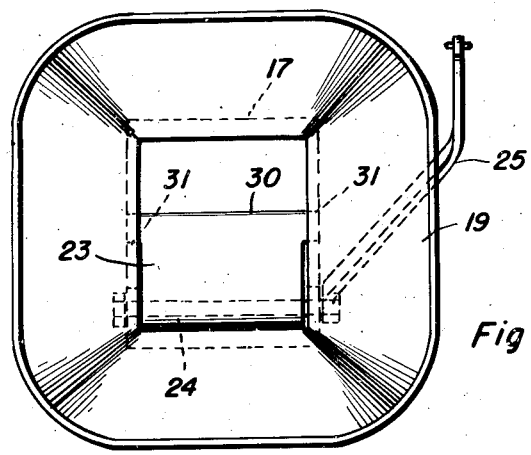
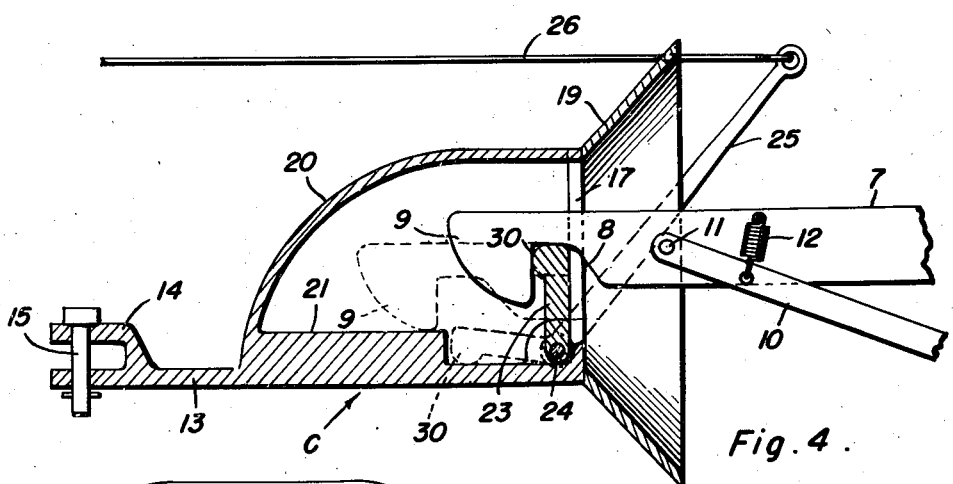
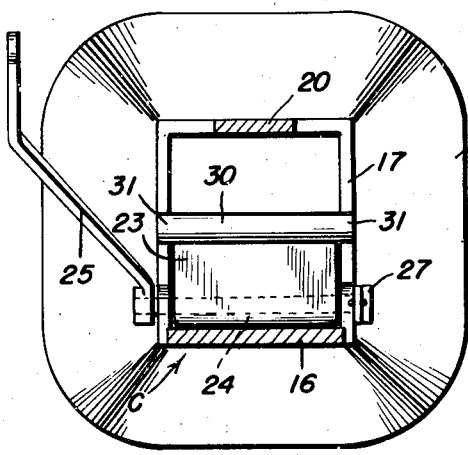

2,478,591

UNITED STATES PATENT OFFICE 2,478,591

TRACTOR HITCH

John M. Miller, Summerdale, Ala.

Application May 3, 1948, Serial No. 24,901

2 Claims. (Cl. 280—33.15)

The present invention relates to certain new and useful improvements in tractor hitches and has reference to improvements involving the particular construction of the latch means carried by the trailer or equivalent vehicle and corresponding improvements in the complemental hitch means forming a part of the draw-bar of the tractor.

More specifically, the invention appertains to a practical and efficient hitch construction wherein the hitching units on the respective vehicles, the tractor and trailer, embody a funnel-like guide which functions to automatically line up the units and guide them into coupling relationship, thus making it possible for the driver of the tractor to simply back his tractor, with its hitch unit, into alignment with the coacting hitch unit on the trailer vehicle, thus effecting the hitching result wanted and obviating the necessity of alighting to the ground to employ the hands in the act of making the coupling complete.

It will be evident from the foregoing that, being conversant with the art to which my invention relates, I am aware that so-called automatic couplers and hitches are not new. Therefore, in reducing to practice the principles of the instant invention, it has been my primary aim to provide an adequate and satisfactory automatic tractor hitch and, in doing so, to invoke certain worthy improvements and refinements which, additively considered, insure attaining the ends wanted with greater certainty and efficiency.

More explicitly, in carrying out my inventive ideas, I contemplate the adoption and use of a draw-bar having an upstanding frame, a bordering guide funnel, and a hingedly mounted retaining plate to accommodate the insertable and removable latch lever or unit which is carried by the trailer vehicle, for example a plow, corn planter, combine or the like.

Other objects and advantages will become more readily apparent from the following description and the accompanying illustrative drawings.

In the drawings, wherein like numerals are employed to designate like parts throughout the views:

Figure 1 is a side elevational view of a tractor and the hitch unit carried thereby, the latter constructed in accordance with the invention and showing same in readiness to receive the latch lever or unit which is carried by the plow or other trailer vehicle;

Figure 2 is a top plan view of the structure seen in Figure 1 with the tractor wheel omitted;

Figure 3 is a rear end elevation of the tractor hitch unit;

Figure 4 is a view in section and elevation showing the two units connected or coupled together, the section being on the line 4—4 of Figure 2, looking in the direction of the arrows; and, Figure 5 is a transverse vertical section on the line 5—5 of Figure 1, looking in the direction of the arrows.

Reference is had first to Figure 1, wherein a fragmentary portion of a tractor is denoted at A, the same having a hitching bar B to accommodate the tractor draw-bar C. The latter part is the improved unit insofar as the tractor is concerned. I have not shown the trailer vehicle but call attention to the fact that it may be a corn planter, turn plow, disc plow, combine or other farm implement or machine. The latter will be provided with one of the hitching units and the tractor will be provided with the other hitching unit, the draw-bar C. Before describing the latter, I will dispose of the unit which will be carried on the trailer. This is in the form of a latch forming lever 7, the same being suitably mounted on the trailer means (not shown) and having a notch 8 defining a latching and retaining nose 9. The numeral 10 is simply a leg or prop which is pivoted in place as at 11 and normally swung up under the tension of the spring 12. The prop will usually hold the latch 7 at a position and on a level to coact with the draw-bar. The latter comprises the draw-bar proper denoted by the numeral 13 and having a clevis 14 fastened to the frame by clevis pin 15. The trailing end portion of the draw-bar is of general triangular form as shown at 16 and this is provided with a substantially rectangular vertical frame 17 at its terminal end. The frame is reinforced by corner webs 18 and said frame carries a substantially bell-like guide and piloting funnel 19. The numeral 20 designates an arched or bowed reinforcing bar which is connected at its upper end with the corresponding portion of the frame 17 and at its lower end with the intermediate portion of the draw-bar. Thus, the draw-bar, brace, frame and funnel form an open framework to accommodate the insertable and removable latch lever 7. The numeral 21 designates a riser which is spaced from the frame 17 to provide a sort of receiving pocket 22 for the downwardly swinging detent plate 23. The latter is hingedly mounted on a rocker shaft 24 which is operable in a forwardly and downwardly swinging position by a control arm 25 actuated by a pull cable or cord 26 which leads to the operator's seat on the tractor (not shown). There is another crank or rocker arm 27 on the opposite end of the rocker shaft and this is connected with a return spring 28 anchored as at 29 on the brace 20. This spring 28 exerts tension which serves to automatically swing the detent plate to the up latching position shown in full lines in Figure 4. The nose 9 of the latch is operable through the opening defined by the frame 17 and said nose may come to rest on the riser 21 to sweep it clear of the detent plate 23 when the latter is in the down dotted line position shown in Figure 4. It will be noted that the upper lip portion of the swingable detent plate is reinforced by a rolled bead 30 as brought out better in Figure 4 and also that the opposite end portions of said plate are formed into extensions 31 which constitute stops and which abut the vertical portions of the holding frame 17. The frame supports the load imposed on the plate 23 and the draw-bar supports both parts and is braced by the bowed piece 20.

Normally the detent plate is in the full line "up" position shown in Figure 4. Then, when the nose 9 on the latch lever 7 is engaged over same, the two vehicles, the tractor and trailer, are hitched or coupled together. To effect a coupling, assuming that the two vehicles are disconnected, the latch lever 7 is propped up in the horizontal or elevated position shown at the right in Figure 1. This puts the nose 9 in a plane to slip into the hitch unit carried by the tractor. By backing up the tractor and lining up the bell or funnel 19 with the lever, it is obvious that when the two units come together, the nose 9 will contact the plate 23 and this will "cam" said plate down to the dotted line positions, where it drops into the pocket 22. Then, the nose will ride onto the riser 21 and come against the shoulder provided by the reinforcing strap 20. Now, the return spring 28 will come into play and the plate 23 will be swung up and behind the nose 9 and into the keeper notch 8, thus effecting the necessary coupling between the respective units. If it is desired to unlatch the hitch means, the tractor is backed up in relation to the trailer to release the strain of the latch lever 7 on the plate 23. Then while the load or weight is off of the plate, the cord 26 is pulled and the arm 25 serves to swing the plate down on its pivot and while the plate is held down in the dotted line position shown in Figure 4 and the tractor is driven forward in relation to the then standing trailer, the vehicles are, in an obvious manner, unhitched.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. In a tractor hitch construction of the class described, a draw-bar provided at one end with a clevis and at its opposite end with a vertical frame having a marginally surrounding rearwardly flaring guide funnel, a reinforcing strap connected with the top portion of said frame at one end and an intermediate portion of the draw-bar at the opposite end, a detent plate hingedly mounted at the junctional portion of the frame and draw-bar and swingable to a vertical position to partially close the opening defined by said frame, and a spring returned crank arm connected with one end portion of the plate.

2. In a tractor hitch construction of the class described, a draw-bar provided at one end with a clevis and at its opposite end with a vertical frame having a marginally surrounding rearwardly flaring guide funnel, a reinforcing strap connected with the top portion of said frame at one end and an intermediate portion of the draw-bar at the opposite end, a detent plate hingedly mounted at the junctional portion of the frame and draw-bar and swingable to a vertical position to partially close the opening defined by said frame, a spring returned crank arm connected with one end portion of the plate, and an actuating arm connected with the opposite end of the plate, said actuating arm having a pull cable.

JOHN M. MILLER.

REFERENCES CITED

The following references are of record in the file of this patent:

UNITED STATES PATENTS

| Number | Name | Date |
|--------|------|------|
| 854,196 | Brown | May 21, 1907 |
| 1,361,166 | Miller | Dec. 7, 1920 |
| 1,699,397 | Klein | Jan. 15, 1929 |
| 2,441,285 | Pfiffer | May 11, 1948 |